Patented Feb. 8, 1949

2,461,339

UNITED STATES PATENT OFFICE 2,461,339

UNSATURATED THIOETHERS OF CYCLIC SULFONES

Rupert C. Morris, Berkeley, John L. Van Winkle, San Lorenzo, and Edward C. Shokal, Oakland, Calif., assignors to Shell Development Company, San Francisco, Calif., a corporation of Delaware No Drawing. Application January 7, 1946, Serial No. 639,694

3 Claims. (Cl. 260—329)

This invention relates to a novel and particularly useful class of compounds comprising the unsaturated thioethers of cyclic sulfones. More particularly, the invention pertains to unsaturated sulfolanyl thioethers.

The thioethers of the invention contain a five-membered heterocyclic ring consisting of four carbon atoms and a sulfonyl radical and having at least one of the nuclear carbon atoms directly attached by a single bond to a divalent sulfur atom which in turn is directly attached to an unsaturated hydrocarbon radical or an unsaturated substituted hydrocarbon radical.

The novel unsaturated sulfolanyl thioethers of the invention contain a five-membered heterocyclic ring consisting of four saturated carbon atoms and a sulfonyl radical and having at least one of the nuclear carbon atoms directly attached by a single bond to a divalent sulfur atom which in turn is directly attached to an unsaturated hydrocarbon or unsaturated substituted hydrocarbon radical, and wherein the remaining free bonds of the nuclear carbon atoms are directly attached to members of the group consisting of the hydrogen atom and the organic radicals. The unsaturated sulfolanyl thioethers may be represented by the formula

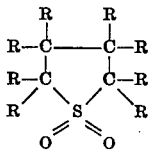

wherein at least one of the R's is the —S—R₁ radical, R₁ representing an unsaturated hydrocarbon radical or an unsaturated substituted hydrocarbon radical, and the remaining R's are members of the group consisting of the hydrogen atom, the hydrocarbon radicals, and the substituted hydrocarbon radicals.

The unsaturated organic radicals which are directly attached to the thio-sulfur atom may be unsaturated hydrocarbon radicals or unsaturated substituted hydrocarbon radicals which contain an unsaturated linkage between two carbon atoms of aliphatic character. The unsaturated substituted hydrocarbon radicals comprise those unsaturated hydrocarbon radicals wherein one or more of the hydrogen atoms has been replaced by an inorganic substituent such as the ammonium, sulfate, nitrate, halide and halate radicals, and the like, and are preferably the halogen-substituted unsaturated hydrocarbon radicals such as chloroallyl, 1-chloro-2-butenyl, alpha-chloromethallyl, 2-chlorocyclohexenyl and the like and their homologues and analogues.

The unsaturated organic radicals which are directly attached to the thio-sulfur atom are preferably the unsaturated hydrocarbon radicals containing an unsaturated linkage between two carbon atoms of aliphatic character, and are more preferably alkenyl or cycloalkenyl radicals. A particularly valuable group of compounds comprises the unsaturated sulfolanyl thioethers wherein the unsaturated hydrocarbon radical contains but one unsaturated linkage consisting of a double bond between two carbon atoms of aliphatic character, at least one of which is not more than one carbon atom removed from the thio-sulfur atom. Examples of the preferred unsaturated hydrocarbon radicals include vinyl, isopropenyl, 2-propenyl, allyl, methallyl, ethallyl, crotyl, tiglyl, cinnamyl, alpha-methylallyl, alpha-ethylallyl, 3-butenyl, and the like and their homologues. Other suitable unsaturated hydrocarbon radicals are 1-butenyl, 1-pentenyl, 1-hexenyl, 2-hexenyl, cyclohexenyl, 3,5,5-trimethyl-2-cyclohexenyl, 3,5,5-trimethyl-3-cyclohexenyl, cyclopentenyl, propargyl, oleyl, and the like and their homologues.

The hydrocarbon and substituted hydrocarbon radicals which R may represent may be cyclic or acyclic, saturated, unsaturated or aromatic, and include the alkyl, aryl, alkenyl, aralkyl, aralkenyl, alkenaryl, cycloalkyl, cycloalkenyl and heterocyclic radicals such as methyl, ethyl, propyl, isopropyl, butyl, isobutyl, sec-butyl, tert-butyl, amyl, hexyl, vinyl, allyl, chloroallyl, methallyl, crotyl, butadienyl, phenyl, dichlorophenyl, pentachlorophenyl, xylyl, benzyl, styryl, cinnamyl, 2-sulfolanyl, 3-sulfolanyl, 2,4-dimethyl-3-sulfolanyl, sulfolenyl, furfuryl, tetrahydrofurfuryl, thiophenyl, tetrahydrothiophenyl, cyclohexyl, 3,3,5-trimethylcyclohexyl, cyclohexenyl, 3,5,5-trimethyl-2-cyclohexenyl, 3,5,5-trimethyl-3-cyclohexenyl, cyclopentadienyl, propargyl, and the like and their homologues. However, when R represents an organic radical, it is preferably a hydrocarbon radical, and more preferably a hydrocarbon radical of saturated character, i. e. not readily hydrogenatable, such as the alkyl, cycloalkyl, aryl, aralkyl and alkaryl radicals. Examples of the saturated hydrocarbon radicals include methyl, ethyl, propyl, isopropyl, butyl, isobutyl, sec-butyl, tert-butyl, cyclohexyl, cyclopropyl, phenyl, xylyl, benzyl, cresyl and 3,3,5-trimethylcyclohexyl. When R represents a hydrocarbon radical, it is preferably an alkyl radical and more preferably a lower alkyl radical containing not more than four carbon atoms, such as the methyl, ethyl, propyl, isopropyl, butyl, isobutyl, sec-butyl and tert-butyl radicals.

Unsaturated sulfolanyl thioethers having the thio-sulfur atom directly attached to an unsaturated hydrocarbon radical of at least three carbon atoms which contains but one unsaturated linkage consisting of a double bond between two aliphatic carbon atoms, one of which is but one saturated carbon atom removed from the thio-sulfur atom, possess particularly valuable properties which make them of particular use in various industrial applications. The preferred group of the beta,gamma-alkenyl sulfolanyl sulfides comprises those wherein the thio-sulfur atom is directly attached to the carbon atom in the 3-position of the sulfolane radical, for example, methallyl 3-sulfolanyl sulfide. Among the valuable beta,gamma-alkenyl sulfolanyl sulfides wherein the sulfolane nucleus is hydrocarbon-substituted, the preferred group comprises those having an alkyl group on each of the carbon atoms in the 2- and 4-positions of the sulfolane ring, for example, allyl 2,4-dimethyl-4-sulfolanyl sulfide.

The numbering system of the sulfolane ring is indicated below:

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure:

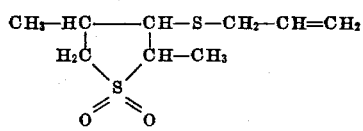

which is termed allyl 2,4-dimethyl-3-sulfolanyl sulfide or allyl 2,4-dimethyl-3-sulfolanyl thioether.

Saturated thioethers of the type of 3-sulfolanyl thioether, methyl 4-methyl-3-sulfolenyl sulfide and tertiary butyl 4-methyl-3-sulfolenyl sulfide are disclosed in the prior art. In all of these compounds, the radical, which is attached to the sulfolane or sulfolene group by means of the divalent sulfur atom, is a saturated radical. Novel compounds have now been prepared wherein the radical joined to the cyclic sulfone group by means of the sulfur atom is an unsaturated organic radical. In other words, the newly prepared compounds comprise a sulfolane ring which contains at least one unsaturated organic radical, preferably an unsaturated hydrocarbon radical, attached to one of the nuclear carbon atoms of the ring by means of divalent sulfur atom. Surprisingly, it has been found that these unsaturated compounds of the invention possess inherent properties which are markedly superior to those of the corresponding saturated compounds. These properties could not be foreseen, and they are of such a nature as to make the compounds of the invention particularly useful in various applications.

The unsaturated sulfolanyl thioethers of the invention may be prepared by any suitable method. A particularly convenient method for the preparation of the unsaturated sulfolanyl thioethers comprises reacting a sulfolene or a hydrocarbon-substituted sulfolene with an unsaturated mercaptan, generally in the presence of a basic-reacting substance, preferably a caustic such as sodium hydroxide. The unsaturated mercaptans may be represented by the formula $R_1$—SH, wherein $R_1$ is an unsaturated hydrocarbon or substituted hydrocarbon radical containing an olefinic linkage between two carbon atoms of aliphatic character, and they may be prepared by reacting the corresponding unsaturated organic halide with sodium hydrosulfide. When a sulfolene or substituted sulfolene having the double bond between two nuclear carbon atoms, one of which is directly attached to the sulfonyl radical, is reacted with the unsaturated mercaptan, a 2-sulfolanyl or substituted 2-sulfolanyl thioether or sulfide is produced. When the unsaturated mercaptan is reacted with a 3-sulfolene, i. e. a sulfolene having the double bond between two nuclear carbon atoms, each of which is once removed from the sulfonyl radical, a 3-sulfolanyl sulfide is formed.

A sulfolane having not more than one unsaturated thioxy radical directly attached to one or more of the nuclear carbon atoms of the sulfolane nucleus, may be prepared by reacting the corresponding unsaturated sulfolenyl thioether with an unsaturated mercaptan.

The novel unsaturated sulfolanyl thioethers of the invention find utility in a large variety of industries. For example, the unsaturated thioethers may be used as insecticides, fungicides and parasiticides or as ingredients of insecticidal, fungicidal and parasiticidal compositions, and as ingredients for use in the manufacture of varnishes, polishes, and the like. Also, these novel compounds may be employed in the preparation of natural or synthetic rubbers, resins, plastics, etc. The beta,gamma-alkenyl-3-sulfolanyl sulfides particularly have been found to be of outstanding value as plasticizers for natural or synthetic rubbers. Moreover, the unsaturated sulfolanyl and sulfolenyl thioethers may be further reached, e. g. sulfurized or sulfated or the like, to produce valuable substances to be used as addition agents in lubricating oils, greases, as detergents, and for a variety of other purposes.

The following examples serve to illustrate the invention:

*Example I*

Approximately 668 parts by weight of methallyl mercaptan were treated with about 10 parts by weight of sodium hydroxide and about 708 parts by weight of 3-sulfolene. At about 45° C. a very vigorous exothermic reaction took place. From the product there was recovered methallyl 3-sulfolanyl sulfide which had a boiling point of 162° C. to 168° C. at 2 mm. and possessed the following physical characteristics:

$n$ 20/D  1.5382
$d$ 20/4  1.2105

*Example II*

Allyl mercaptan and 3-sulfolene are reacted according to the procedure described in Example I to produce allyl 3-sulfolanyl sulfide.

*Example III*

When crotyl mercaptan and 3-sulfolene are reacted in the presence of sodium hydroxide according to the process of Example I, crotyl 3-sulfolanyl sulfide is formed.

Example IV

Following the procedure described in Example I, allyl mercaptan is reacted with 2-sulfolene to obtain allyl 3-sulfolanyl sulfide.

Example V

Allyl mercaptan and 2,4-dimethyl-3-sulfolene are reacted according to the procedure described in Example I to produce allyl 2,4-dimethyl-4-sulfolanyl sulfide.

Similarly, there may be prepared tiglyl 3-sulfolanyl sulfide, crotyl 2,4-dimethyl-4-sulfolanyl sulfide, allyl 2,4-dimethyl-4-sulfolanyl sulfide, chlorallyl 2,4-dimethyl-4-sulfolanyl sulfide, cinnamyl 3-ethyl-4-sulfolanyl sulfide, 3,5,5-trimethyl-2-cyclohexenyl 3-sulfolanyl sulfide, 1-butenyl 3-sulfolanyl sulfide, methallyl 2-sulfolanyl sulfide, ethallyl 2-sulfolanyl sulfide, 2-cyclohexenyl 2-sulfolanyl sulfide, allyl 3-phenyl-2-sulfolanyl sulfide.

We claim as our invention:

1. The compound having the formula

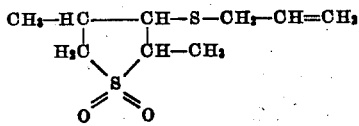

2. The compound having the formula

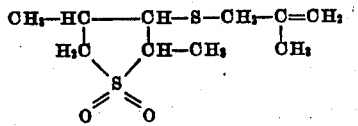

3. A compound having the formula

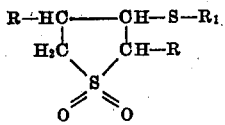

wherein $R_1$ is a beta, gamma-alkenyl radical and the R's are alkyl radicals.

RUPERT C. MORRIS.
JOHN L. VAN WINKLE.
EDWARD C. SHOKAL.

REFERENCES CITED

The following references are of record in the file of this patent:

UNITED STATES PATENTS

| Number | Name | Date |
| --- | --- | --- |
| 2,357,344 | Morris et al. | Sept. 5, 1944 |
| 2,393,925 | Morris et al. | Jan. 29, 1946 |
| 2,394,251 | Morris et al. | Feb. 5, 1946 |